Figure 2:
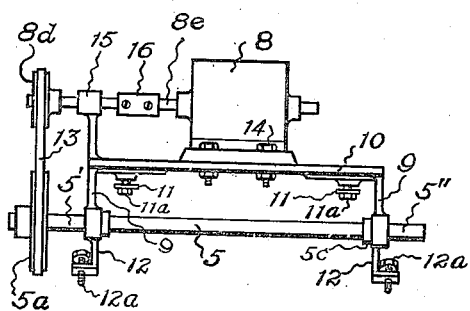

Oct. 4, 1949. E. H. LANGE 2,483,777
MOTOR-POWER PROPELLED LAWN MOWING MACHINE
Filed June 25, 1947

Edward H. Lange.
INVENTOR

Patented Oct. 4, 1949

2,483,777

UNITED STATES PATENT OFFICE 2,483,777

MOTOR-POWER PROPELLED LAWN MOWING MACHINE

Edward H. Lange, Baltimore, Md.

Application June 25, 1947, Serial No. 757,033

10 Claims. (Cl. 56—26)

This invention relates to lawn mowing machines, and more particularly to motor-power propelled lawn mowing machines. The principal object of this invention is to provide a motor-power adaptor and control system suitable for use with a conventional form of lawn mowing machine, and having both a high degree of maneuverability and ease of handling for turning, and back and forth operation for example around shrubbery, and a high degree of economy of structure.

Another object of this invention is to provide a clutch controlled motor-speed reducing device utilizing directly the speed reduction obtainable by engagement of a drive-shaft with the periphery of resilient rubber-tire ground-wheels.

Still another object of this invention is to provide a simple economical motor-gravity clutch-closing device, and adjustable means for regulating the compression between the drive-shaft and the resilient ground-wheels.

A further object is to provide a simple quickly responsive clutch opening structure, requiring only the slight elevation of the handle-bar member normally held for guiding the lawn mowing machine, to disengage the motor-power from the ground-wheels.

These objects and others can be more clearly understood from the following distinguishing features pointed out with reference to motor-power operated lawn mowers heretofore known and used, also from the following specification with accompanying drawings.

The well known wide disparity in costs between conventional manually powered lawn mowers and motor-power operated lawn mowers, is fully reflected in the predominance of such conventional lawn mowers upon average size suburban lawns. Moreover, this wide disparity in initial cost is not the only adverse characteristic of such motor-power operated lawn mowers; lack of ease of maneuverability, or lack of smoothness of cut comparable to conventional manually powered lawn mowers is also a characteristic notwithstanding the higher initial cost, as will presently be pointed out in further detail.

Whether an electric motor is employed, as illustrated in a preferred embodiment of this invention, for example for the average size suburban lawn, or an internal-combustion engine capable of covering a larger territory, in either case a speed reduction of the general order of magnitude of twenty to one is necessary from motor speed to speed of ground-wheels, for the customary motor speeds of approximately 1750 revolutions per minute and suitable ground-wheel sizes. In addition to the necessity of providing this relatively large speed reduction in motor-power propelled lawn mowers, a clutch function is necessary; as is well known however, while the power is ultimately disengaged or engaged by any type of clutch, the resultant ease of maneuverability of the lawn mower is widely variable, and largely lacking in such lawn mowers currently used when back and forth movement is required, and quick disengagement of the clutch is required without a shift of hand positions, and without wrist movements against spring tension.

Notwithstanding the lack of maneuverability in such lawn mowers currently used which contain both the necessary speed-reduction factor and the clutching factor, such machines commonly employ a multiplicity of parts, and special organizations quite distinct from the conventional manually powered helical-scissors type of lawn mowing machine, making the wide disparity of costs heretofore mentioned inevitable.

For example, several instances of other types of motor-powered lawn mowers currently used will be noted, in which the above-noted essential factors are compromised. In one such machine, a chassis with ground-wheels contains a motor-powered vertical shaft to which a large wheel with attached knives is fastened. No motor-propulsion of the chassis is employed, transportation being manually powered. It is well known that such rotating-knife action does not provide smoothness of cut comparable with that of the conventional lawn mower, and that this sacrifice of motor propulsion obviating the expense of both of the above-noted factors has nevertheless not substantially modified the cost disparity mentioned.

In another currently employed type of lawn mower, clutching is dispensed with; it is thus necessary to turn the electric motor on and off by switching means. Frequent switching on and off of the motor such as would be necessary for any back and forth usage around shrubbery or boundaries, results in highly undesirable fluctuations of house-circuit voltage; satisfactory maneuverability for turning is also lacking, and again the cost disparity mentioned is not largely modified since this type of lawn mower necessitates expensive modifications of the conventional lawn mower. This type of machine employs the pinion to drive the annular gear in the ground-wheel. A special shortened helical cutter is required with pulley or sprocket-wheel mounted thereon, and driven by the motor which is mounted in a fixed position upon the frame. Since there is no clutch, the required differential of the ground wheels for turning the lawn mower is not present when the motor is running.

In other known applications of motor-power to lawn mowing machines, substantial forces must be continuously applied by the operator to the handles of a handle-bar member, either vertically upward or downward, for enforcing adequate load-driving contact. These machines will not run along the ground without extraneous force application. Not only are these required extraneous force applications disadvantageous, per se, but they seriously impair essential functioning of the lawn mower. E. g. downward forces act about the ground-roller as a fulcrum, and reduce the necessary traction of the ground wheels with the ground concurrently with efforts to thereby secure greater load-driving traction; likewise upward forces upon the handles to enforce greater load-driving traction operate to concurrently raise the ground-roller and knife-blade off of the ground, and tip the machine forward. The present invention distinguishes sharply from these adverse features, in requiring no vertical force applications upon the handles during the grass-cutting operation, and further in substantially increasing the traction of the ground-wheels with the ground by the large gravity force of the power-adaptor, such as illustrated at 8c, Fig. 1b, substantially forward of the ground-roller.

Figure 3:
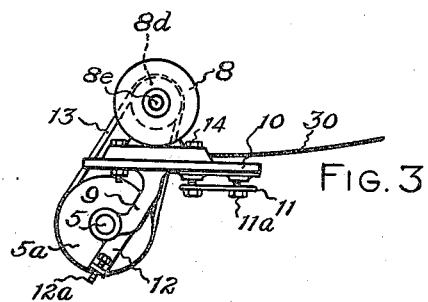
Figure 1B:
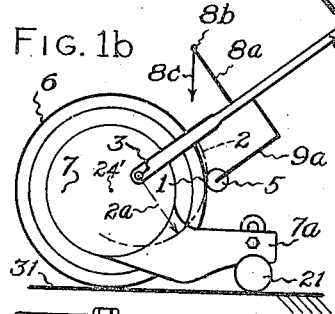
Figure 1:
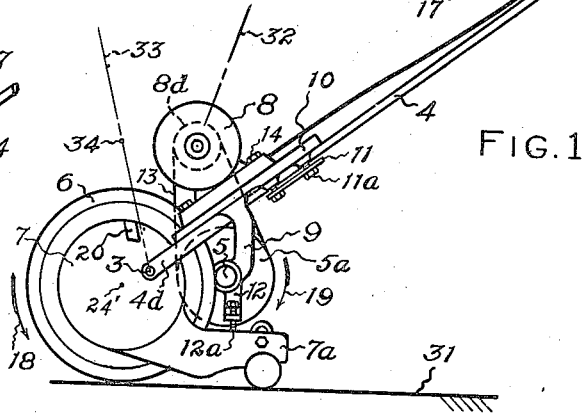
Figure 1A:
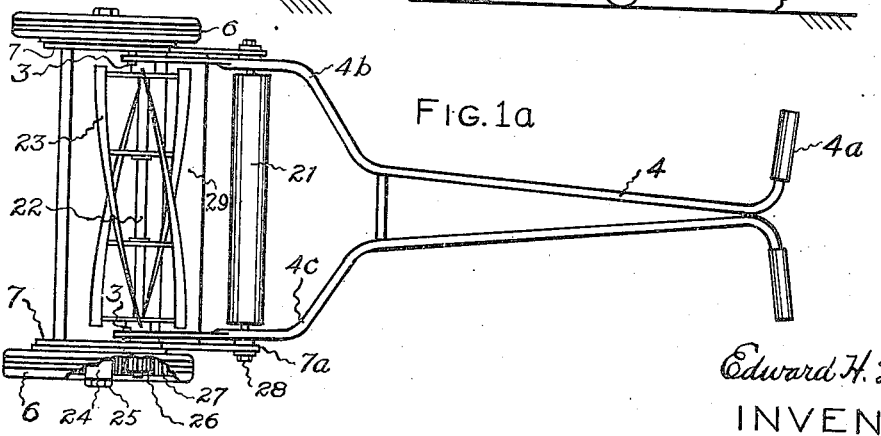

The manner in which the objections above-noted, and others, are overcome in the present invention will be more clearly evident from the following specification, and from the accompanying drawings, in which Fig. 1a illustrates a conventional manually powered helical-scissors lawn mowing machine for which this invention is applicable; Fig. 1b illustrates in diagram form certain essential features of the gravity clutch-control and motor-speed reducing system of this invention applied to a lawn mower such as in Fig. 1a; Fig. 1 illustrates in diagram form the gravity-clutch controlled motor-speed reducing device of this invention; Fig. 2 illustrates further details in a front view of parts of the invention separate from the lawn mowing machine, and Fig. 3 illustrates a side view of these parts.

Referring to Fig. 1a, a conventional lawn mowing machine is shown, with helical blades such as 23, a knife-blade 29 forming the scissors with rotating blades 23, shaft 22 which supports the helical blades 23 and rotates them, and pinion 26 upon shaft 22. The frame member such as 7 with extension 7a, supports the bearings in which shaft 22 turns, and likewise supports the adjustable ground-roller 21, which is adjustable as to height of frame extension 7a above the ground, in a manner well understood. At 6 is one of the ground-wheels for transporting the mowing machine over the ground, having a hub such as 24 rotatable about a bolt member 25 fastened to the frame 7. The periphery of ground-wheels 6 is understood to have a resilient covering, such as rubber tires. Likewise the pinion 26 is understood to contain an interior ratchet or uni-directional engaging mechanism, such that forward movement of the lawn mower turns the pinion 26 through contact with the annular gear 27 which is part of the wheel 6, and turns the blades 23 toward the knife-blade 29 for cutting, whereas backward movement of the lawn mower does not engage the pinion 26 with the shaft 22, in a manner well understood.

At 3, on each side of the frame member 7, is a pivot fastened to the frame member. At 4 is a handle-bar members for controlling movement of the lawn mowing machine over the ground; a metal tubular form of handle-bar member is illustrated, the symmetrical sides being commonly welded together, and the ends toward the ground-wheels being flattened and pivotally attached to the pivots 3, so that the handle-bar member is movable in a plane perpendicular to the ground and to the axis of the ground-wheels. At 4a are resilient means for holding the handle-bar member.

Referring to Fig. 1b, a side view is illustrated in diagram form of a lawn mower such as shown in Fig. 1, together with certain important features of the gravity-clutch controlled motor-speed reducing device of this invention. At 5 is illustrated a drive-shaft in direct contact with the resilient ground-wheel 6, at the contact point 1. At 2 is illustrated part of a circle having the radius 2a about the pivot 3 as a centre. At 9a is shown a member fixed to the handle-bar member 4, for supporting the drive-shaft 5 in a fixed position relative to the handle-bar member 4, and at 8a is shown a member fixed to the handle-bar member 4 and capable of providing a substantial gravity force, illustrated at the vector 8c acting through a point such as 8b upon the member 8a. The radius 2a of circle 2 about pivot 3 passes through the contact point 1. At 24' is shown the centre or axis of the ground-wheel 6. It will be noted that for a plane passing through an axis such as 24' and an axis of the pivots 3, distances along this plane for example from the pivots 3 to the corresponding periphery of wheels 6 and toward the rear of the lawn mower are a minimum; thus, any other distances from pivots 3 to points along the periphery of ground-wheels 6 and in this vicinity will be larger. For example, if a drive-shaft such as 5 with contact point 1 is located substantially below, that is rearward from the plane which includes both the axis 24' of the ground-wheels 6 and the axis of the pivots 3, then when the handle-bar member 4 to which shaft 5 is attached is elevated as indicated by the arrow 17 a positive clearance or separation is established between drive-shaft 5 and ground-wheel 6, as indicated by the deviation between the circle 2 and the periphery of the wheels 6. It will also be noted that if the point of contact 1 were located at certain positions forward of the above-mentioned plane, then elevation of the handle-bar member 4 would serve only to move the contact point 1 within the periphery of ground-wheel 6, that is to tighten the shaft 5 against the resilient tire, and would be of no use for purposes of this invention.

It will also be noted that pivots 3 as illustrated are preferably substantially above the axis 24' of the ground-wheels 6, to provide adequate clearance for shaft 5 and bearing member such as 9 from the frame-extension, such as 7a, for carrying out this invention. In conventional lawn mowers provision is made only for manual power use, and pivots such as 3 are located only to accommodate a downward force-action along the handle-bar member, made to pass under the axis 24' of ground-wheels, to avoid upsetting of the mower, i. e. lifting of the ground-roller off the ground. In many conventional mowers currently produced, pivots such as 3 are located nearly on a horizontal line through axis 24', and in addition, frame-extensions in some machines are made to rise sharply from the ground-roller forward, leaving no clearance for a drive-shaft such as 5, to be located in accordance with the necessary conditions set forth in the previous paragraph, if the furnished pivot-location were employed. Such impediments to the shaft 5, where present, require at most a relocation of the pivots 3 to a more elevated position above the axis 24' for the purpose of carrying out this invention; it will be noted therefore that the present invention cannot be inevitably carried out by at once attaching the power-adaptor to any lawn mowing machine.

By means of a large force 8c which in this invention is established by the weight of the motor employed for propelling the lawn mowing machine, a large moment is set up pressing the drive-shaft 5 into the periphery of the rubber or resilient tire of the ground-wheel 6 and establishing a contact surface between shaft 5 and wheel 6 adequate for driving the load upon the ground-wheels 6 and moving the lawn mowing machine in a forward direction. Without any other forces acting upon the handle-bar member than the weight 8c of the motor employed, and the corresponding reactions at the pivots 3 and contacts 1 to hold the handle-bar member in an equilibrium position, large forces may be developed pressing the drive-shaft 5 against the wheels 6; means for modifying this force and limiting the downward displacement of the handle-bar member 4 are hereafter described.

Referring to Fig. 1 a lawn mowing machine such as heretofore described is shown with ground-wheels 6 upon ground 31, and the Fig. 2 and Fig. 3 illustrate in further detail certain parts of the invention illustrated in Fig. 1. Referring to these figures, at 10 is shown a base-plate having a fastening means for securely fastening to the handle-bar-member 4, for example by bolts such as 11a and cleat members such as 11, the cleat members serving to adjustably and securely clamp the base-plate upon the handle-bar member, for example at the positions indicated at 4b and 4c of Fig. 1a. Mounted centrally upon the base-plate 10 is the motor 8, centrally mounted in the transverse direction to apply substantially equal clutching force between the drive-shaft 5 and ground-wheels 6, and at each of the clutching positions indicated by 5' and 5" upon shaft 5, the motor being securely fastened to the base-plate 10 for example by bolts 14. At 9 are shown bearing members at each end of the base-plate for securely supporting the drive-shaft 5 in the vicinity of each of the ground-wheels 6, these bearing members being either an integral part of the base-plate 10, or securely fastened to the base-plate 10, and having bearings in which the drive-shaft 5 is free to rotate about the axis of shaft 5. The bearing members 9 are identical with the member 9a of Fig. 1b illustrating a fixed position in relation to the handle-bar member 4, and likewise the motor 8 identically represents the member 8a of Fig. 1b illustrating a fixed position above the handle-bar member 4 and providing a gravity force such as 8c. Collars such as 5c are attached to the drive-shaft 5 and located adjacent the bearing members to prevent lateral movement of drive-shaft 5 beyond a small clearance, in a manner well understood. A power-transmission linkage between the motor shaft 8e and the drive-shaft 5 is shown, requiring but a single belt drive shown at 13, connecting the pulley 8d with the pulley 5a which is fastened to the drive-shaft 5. At 15 is an extension-bearing for the motor-shaft 8e, this shaft being extended through the shaft-coupling 16. The extension bearing 15 is securely fastened to the base-plate 10, it will be understood however, that an adjustable bearing adjustable as to height above the base-plate 10 may be employed, permitting alignment, and shims to be employed under the motor to accommodate wear of the belt 13. Pulley 8d is fastened to the extended motor shaft, extended from motor-shaft 8e. At 12 are shown stop-members, having means such as screws 12a thereon for regulating the compression between drive-shaft 5 and ground-wheels 6. The screws 12a are located so as to contact the frame extension 7a of the lawn mowing machine, without interfering with the manual elevation of the handle-bar member 4 as shown by arrow 17; the stop-members 12 are securely attached to the bearing members 9, and may be an integral part of the bearing members 9. At 20 is a projection upon the frame member 7 of the lawn mowing machine which may be used when the lawn mowing machine is not in use, particularly when the machine is being stored and to economize the space required; the projection 20 is located so as to engage the handle-bar member 4 when the motor-shaft 8e is in an elevated position approximately over the axis 24' of the ground-wheels, indicated for example by the point 34 upon the radial line 33 through the pivot 3. In this position the handle-bar member occupies a position indicated approximately by the radial line 32 through the pivot 3, and the projection 20 serves to stabilize the machine from toppling forward.

While an electric motor is illustrated, supplied by the supply circuit indicated at 30, it will be understood that this invention is not limited to this power source, and that a small gasoline motor may alternatively be used. It will be noted that the force necessary to elevate the handle-bar member 4 for opening the clutch is a relatively small percentage of the motor-weight; for the sizes of machine in which a high degree of maneuverability is useful this force does not exceed several pounds.

Important features of operation include the exact concurrence of the unclutching operation with the normal elevation of the handle-bar which takes place when the lawn mower is pulled backward in operations calling for advantageous back and forth cutting. This spontaneity of clutch action and synchronization with normal handle-bar movement is in contrast with the usual awkward manipulation of auxiliary levers extended to the vicinity of the handles 4a, requiring wrist movements against stiff springs, or requiring a shift of hand positions to manipulate a lever or requiring substantial forces to be continuously applied to the handles while cutting. Also, in the present invention, when the clutch is opened by a slight amount of elevation of the handle-bar member, the wheels are as completely free for backward pulling of the lawn-mower or for turning as in the conventional manually operated lawn-mower, whereas unclutching is carried out in many currently used motor-power operated lawn mowing machines in such a manner as to leave connected with the ground-wheels sufficient residual linkages to substantially retard backward pulling of the machine.

The high speed-reduction ratio necessary together with the clutching operation, as heretofore carried out in other motor-power propelled lawn-mowers has in practice necessitated at least two belts in series, or chain drives, or worm-gear reduction, with a separate clutch mechanism, necessitating a multiplicity of parts; nevertheless these more costly organizations have not provided the ease of maneuverability nor the normal concurrence of power-control with handle-bar movement provided in the simpler gravity-clutch controlled motor-speed reducing device of this invention.

Having described how my invention is carried out, it will be apparent to one skilled in the art that modifications may be made in the particular organization shown and described without departing from the scope of my invention, as set forth in the appended claims.

What is claimed is:

1. In a motor-power propelled lawn mowing machine having a frame member, ground-wheels mounted to said frame member for translation of said mowing machine over the ground, ground-roller means attached to said frame member rearward from said ground-wheels, a handle-bar member pivotally attached to said frame member and movable in a plane perpendicular to the ground and to the axis of said ground-wheels, a motor-gravity power-adaptor mechanism including a motor attached solely to said handle-bar member with centre of gravity thereof forward of said ground-roller means, said power-adaptor mechanism having transverse bearing members with centres thereof disposed below a plane through the axis of said ground-wheels and the axis of said pivotal attachment, a transverse drive-shaft means supported in said bearing members normally held in adequate driving contact with said ground-wheels by the gravity-moment of said power-adaptor mechanism about said pivotal attachment, a power-transmission linkage connected between said motor and said drive-shaft means, and means for regulating limits of downward movement of said power-adaptor mechanism by gravity moments, including a strut-member for engaging said frame member.

2. In a lawn mowing machine having a frame member and ground-wheels mounted to said frame member for translation of said machine over the ground, a motor-gravity clutched rotational speed reducer including a handle-bar member pivotally attached to said frame member above the axis of said ground-wheels and movable in a plane perpendicular to the ground and to the axis of said ground-wheels, and a motor-gravity power-applicator including a motor fastened solely upon said handle-bar member, said power-applicator having transverse bearing members with centres thereof below a plane through the axis of said ground-wheels and the axis of said pivotal attachment, a transverse drive-shaft means supported in said bearing members normally held in sufficient driving contact with said ground-wheels by the gravity-moment of said power-applicator about said pivotal attachment, a power-transmission linkage connected between said motor and said drive-shaft means, and means for regulating limits of downward movement of said power-applicator, including a strut-member for engaging said frame member.

3. A motor-gravity power-transfer device for controlling application of motor power to a lawn mowing machine having a frame member, ground-wheels upon said frame member for translation of said machine over the ground, and ground-roller means attached to said frame member rearward of said ground-wheels, said device including a handle-bar member pivotally attached to said frame member above the axis of said ground-wheels and movable in a plane perpendicular to the ground and to said axis, and a power-adaptor including a motor, fastened solely to said handle-bar member with the centre of gravity thereof forward from said ground-roller means, having transverse bearing members rearward of a plane through the axis of said ground-wheels and the axis of said pivotal attachment, a transverse drive-shaft means supported by said bearing members normally held in sufficient driving contact with said ground-wheels by gravity of said power-adaptor, and a power-transmission linkage connected between said motor and said drive-shaft means.

4. In a lawn mowing machine having a frame member, ground-wheels mounted to said frame member for transporting said machine over the ground, and ground-roller means attached to said frame member rearward of said ground-wheels, a motor-gravity propulsion control-device, said device including a handle-bar member pivotally attached to said frame member above the axis of said ground wheels, and a power-adaptor including a motor, having fastening means for fastening said power-adaptor solely to said handle-bar member with centre of gravity thereof forward of said ground-roller means, and having bearing members attached thereon to extend sufficiently below a plane through both the axis of said ground-wheels and of said pivotal attachment to provide sufficient increase of separation between said ground-wheels and the bearing surface of said bearing members with elevation of the handle-bar member, a transverse drive-shaft means supported in said bearing members normally held in sufficient driving contact with said ground-wheels by gravity moment of said power-adaptor about said pivotal attachment, a power-transmission linkage between said motor and said drive-shaft means, and adjustable strut means capable of engaging said frame member, for regulating limits of downward movement of said power-adaptor member.

5. A motor-gravity power-adaptor for controlling application of motor-power in a lawn mowing machine having a frame member, resilient ground-wheels mounted upon said frame member for transporting said machine over the ground, ground-roller means attached to said frame member rearward from said ground-wheels, pivots upon said frame member, and a handle-bar member attached to said pivots, movable in a plane perpendicular to the ground and to the axis of said ground-wheels, said power-adaptor having a base-plate, a motor mounted solely upon said base-plate, fastening means for fastening said base-plate solely to said handle-bar member with the centre of gravity of said power-adaptor forward of said ground-roller means, a drive-shaft means normally held in driving adequate contact with said ground-wheels by the gravity moment of said power-adaptor about said pivots, transverse bearing members attached to said base-plate for supporting said drive-shaft means substantially below a plane including both the axis of said ground-wheels and of said pivots for positive separation of said drive-shaft from said resilient ground-wheels with an elevation of said handle-bar member, a power-transmission linkage connected between said motor and said drive-shaft means, and adjustable strut means capable of engaging said frame member for regulating the limits of downward movements of said power-adaptor by gravity moments.

6. In a lawn mowing machine having a frame member, resilient ground-wheels upon said frame member for transporting said machine over the ground, ground-roller means attached to said frame member rearward from said ground-wheels, and a handle-bar member for controlling movements of said machine, said handle-bar member being pivotally attached to said frame member and movable in a plane perpendicular to the ground and to the axis of said ground-wheels, a motor-gravity traction-control device including a motor, fastening means for fastening said device solely to said handle-bar member with the centre of gravity of said device substantially forward of said ground-roller means, a drive-shaft means normally held in sufficient driving contact with said ground-wheels by the gravity-moment of said device about said pivotal attachment, bearing members attached to said device for supporting said drive-shaft means sufficiently below a plane including both the axis of said ground-wheels and of said pivotal attachment to yield positive separation of said drive-shaft means from said resilient ground-wheels with an elevation of said handle-bar member, and a power-transmission linkage connected between said drive-shaft means and said motor.

7. A motor-gravity traction-control appliance for a lawn mowing machine, said machine having a frame, resilient ground-wheels upon said frame, ground-roller means upon said frame rearward from said ground-wheels, and a handle-bar member pivotally attached to said frame for controlling movements of said machine, said appliance including a motor, and having fastening means for fastening said appliance solely to said handle-bar member with centre of gravity of said appliance substantially forward of said ground-roller means, a drive-shaft means normally held in sufficient load-driving contact with said resilient ground-wheels by gravity moment of said appliance about said pivotal attachment, bearing members for supporting said drive-shaft means sufficiently below a plane including both the axis of said ground-wheels and the axis of said pivotal attachment to yield positive separation between said drive-shaft means and said resilient ground-wheels with an elevation of said handle-bar member, a power-transmission linkage connected between said motor and said drive-shaft means, and means for regulating limits of downward movement of said appliance by gravity moments, including adjustable strut-means capable of engaging said frame.

8. A motor-gravity traction-control appliance in a lawn-mowing machine, said machine having a frame member, ground wheels upon said frame member, a ground roller upon said frame member rearward from said ground wheels, transverse pivot means upon said frame member, and a handle bar member, said appliance having a base-frame for pivotal support and movement upon said pivot means, gravity means for maintaining adequate power-clutching with said ground wheels and for simultaneously maintaining adequate load-driving traction between said ground wheels and the ground, said means including a motor fastened upon said base-frame with centre of gravity of said motor rearward from the axis of said ground wheels and from the axis of said pivot means, and forward from the axis of said ground roller, and transverse drive-shaft means forced against the periphery of said ground wheels by gravity moment of said motor about said pivot means; means for holding and directing movement of said drive-shaft means relative to said ground wheels, including bearing members disposed upon said base-frame rearward from a plane passing through the axis of said ground wheels and the axis of said pivot means, a power-transmission linkage between said motor and said drive-shaft means, and means for lifting said motor to disengage said drive-shaft means from said ground wheels, including said handle bar member.

9. In combination with the structure of claim 8, said appliance having means for regulating limits of downward movement of said drive-shaft means by said gravity moment, including an adjustable strut member capable of abutting and pressing upon said frame member.

10. A motor-gravity traction-control device upon a lawn-mowing machine, said machine having a frame, ground wheels upon said frame, a ground roller upon said frame rearward from said ground wheels, transverse pivot means upon said frame, and a handle bar member, said device having a base-frame for pivotal support upon and movement about said pivot means, gravity means for maintaining adequate power-transfer to said ground wheels and for simultaneously maintaining adequate load-moving traction between said ground wheels and the ground, said means including a motor fastened upon said base-frame with centre of gravity of said motor rearward from the axis of said pivot means and from the axis of said ground wheels, and forward from the axis of said ground roller, and transverse drive-shaft means forced against the periphery of said ground wheels by gravity moment of said motor about said pivot means; means for holding and directing movement of said drive-shaft means relative to said ground wheels, including bearing members disposed upon said base-frame rearward from a plane passing through the axis of said ground wheels and the axis of said pivot means, a power-transmission linkage between said motor and said drive-shaft means, means for regulating limits of downward movement by said gravity moment upon said drive-shaft means including a strut member capable of pressing upon said frame, and means for lifting said motor to disengage said drive-shaft means from said ground wheels, including said handle bar member.

EDWARD H. LANGE.

REFERENCES CITED

The following references are of record in the file of this patent:

UNITED STATES PATENTS

| Number | Name | Date |
| --- | --- | --- |
| 1,764,851 | Palm | June 17, 1930 |
| 1,819,791 | Reed | Aug. 18, 1931 |
| 1,866,380 | Wagner | July 5, 1932 |